United States Patent
Buchwald et al.

(10) Patent No.: US 10,241,984 B2
(45) Date of Patent: Mar. 26, 2019

(54) CONFLICT RESOLUTION OF CSS DEFINITION FROM MULTIPLE SOURCES

(71) Applicant: International Business Machines Corporation, Armonk, NY (US)

(72) Inventors: Jan-Paul Buchwald, Boeblingen (DE); Peter B. Schnitzler, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1582 days.

(21) Appl. No.: 13/726,374

(22) Filed: Dec. 24, 2012

(65) Prior Publication Data

US 2013/0174021 A1    Jul. 4, 2013

(30) Foreign Application Priority Data

Jan. 2, 2012 (EP) ..................... 12150002

(51) Int. Cl.
*G06F 17/00* (2006.01)
*G06F 17/22* (2006.01)

(52) U.S. Cl.
CPC .................. *G06F 17/227* (2013.01)

(58) Field of Classification Search
CPC ... G06F 17/2247; G06F 17/211; G06F 17/227
USPC ........................................... 715/235
See application file for complete search history.

(56) References Cited

U.S. PATENT DOCUMENTS

| | | | |
|---|---|---|---|
| 7,770,108 B2 | 8/2010 | Fiedorowicz et al. | |
| 8,959,427 B1 * | 2/2015 | Carlsson | |
| 9,542,379 B1 * | 1/2017 | Joshi | G06F 17/248 |
| 2006/0236223 A1 * | 1/2006 | Aubert | |
| 2007/0028164 A1 * | 2/2007 | Kawanishi | G06F 17/2247 715/207 |
| 2007/0112810 A1 * | 5/2007 | Jonsson | G06F 17/2247 |
| 2007/0240041 A1 * | 10/2007 | Pearson | 715/522 |

(Continued)

FOREIGN PATENT DOCUMENTS

| | | |
|---|---|---|
| JP | 2005085057 A | 3/2005 |
| WO | 2013102802 A1 | 7/2013 |

OTHER PUBLICATIONS

Int'l Appln. No. PCT/IB2012/056173, Interntional Search Report, dated Mar. 4, 2013, 2 pg.

(Continued)

*Primary Examiner* — Stephen S Hong
*Assistant Examiner* — Marshon L Robinson
(74) *Attorney, Agent, or Firm* — Cuenot, Forsythe & Kim, LLC

(57) ABSTRACT

Conflict resolution of cascading style sheet definitions from multiple sources includes storing a rule for a rewriting of cascading style sheet definitions and intercepting, within a proxy component including a processor, a client server communication of a web page request, wherein the web page request originates from a client, and wherein a response to the web page request includes at least two cascading style sheet definitions. At least one of the two cascading style sheet definitions is rewritten based on the rule, resulting in non-conflicting cascading style sheet definitions. The non-conflicting cascading style sheet definitions are provided together with related content to the client.

18 Claims, 5 Drawing Sheets

(56) References Cited

U.S. PATENT DOCUMENTS

| | | | |
|---|---|---|---|
| 2008/0155396 A1* | 6/2008 | Dubinko | G06F 17/217 |
| | | | 715/251 |
| 2010/0011284 A1* | 1/2010 | Ramakrishna et al. | 715/234 |
| 2010/0180194 A1 | 7/2010 | Ji et al. | |
| 2010/0299589 A1* | 11/2010 | Yamada | G06F 17/30867 |
| | | | 715/235 |
| 2012/0005429 A1* | 1/2012 | Kalasapur et al. | 711/118 |
| 2013/0067322 A1* | 3/2013 | Gould et al. | 715/235 |
| 2013/0159839 A1* | 6/2013 | Joffray et al. | 715/235 |
| 2015/0161082 A1* | 6/2015 | Levien | G06F 17/214 |
| | | | 715/235 |

OTHER PUBLICATIONS

Int'l Appln. No. PCT/IB2012/056173, Written Opinion, dated Mar. 12, 2013, 3 pg.

Hiroshi Shimoda, "Firefox no Kakucyoukinou wo Tukurou," Nikkei Linus, Jul. 8, 2006, vol. 8, No. 7, pp. 92-97, [original magazine article and translation, 16 pg].

* cited by examiner

CONFLICT RESOLUTION OF CSS DEFINITION FROM MULTIPLE SOURCES

CROSS-REFERENCE TO RELATED APPLICATIONS

This application claims the benefit of European Application Number 12150002.9 filed on Jan. 2, 2012, which is fully incorporated herein by reference.

BACKGROUND

When delivering content within a website it is best practice that the data itself and the presentation layout are distinguished or separated. For websites, this is done using the Cascading Style Sheets (CSS) standard. CSS standard defines a language to apply look-and-feel (e.g., color, font-size, position of elements, etc.) to any given markup establishing an appearance on a user-interface. A related CSS style definition consists of a selector, declaring which of the markup elements the style applies to, and a declaration block of property-value pairs. Selectors may be based on a particular type of markup element (e.g., h1, i.e., all first order headings), a CSS class (e.g., .customStyle, i.e., all elements tagged with the CSS class customStyle), or a combination of both. The property-value pairs typically contain actual layout definitions of the style, like color:black, i.e., a black color is used for displaying.

CSS-styles are typically defined on three different levels:
1. Inline style defined directly for a particular markup element, in which case the selector is omitted (e.g., <p style="color:blue;margin-left:10 px">);
2. Embedded style definitions in markup: a text block of CSS definitions enclosed by the <style> tag; and
3. External style sheet files: a separate file containing CSS definitions referenced from the markup, e.g. <link rel="stylesheet" href="style.css" type="text/css">

The CSS specification itself defines the following evaluation order for style definitions:
- Inline style definitions over-rule embedded or external style sheets, meaning that inline styles are always considered as definitive, whereas embedded and external CSS definitions are applied with lower priority and treated equally.
- More specific selectors over-rule less specific selectors— e.g., if there are definitions for "h1 .customStyle" and "h1", any h1 element tagged with the customStyle class is styled according to the definitions of "h1 .customStyle".

The mechanisms of CSS work well in environments where the website operator or designer has control over the styles that are being delivered. For solutions that aggregate markup from multiple sources, e.g., like portal environments, several problems discussed in context of FIG. 2 may occur.

BRIEF SUMMARY

A method of conflict resolution of cascading style sheet definitions from multiple sources includes storing a rule for a rewriting of cascading style sheet definitions and intercepting, within a proxy component comprising a processor, a client server communication of a web page request, wherein the web page request originates from a client, and wherein a response to the web page request comprises at least two cascading style sheet definitions. The method further includes rewriting at least one of the two cascading style sheet definitions based on the rule, resulting in non-conflicting cascading style sheet definitions and providing the non-conflicting cascading style sheet definitions together with related content to the client.

A system for conflict resolution of cascading style sheet definitions from multiple sources includes a processor. The processor is programmed to initiate executable operations. The executable operations include storing a rule for a rewriting of cascading style sheet definitions and intercepting, within a proxy component comprising a processor, a client server communication of a web page request, wherein the web page request originates from a client, and wherein a response to the web page request comprises at least two cascading style sheet definitions. The executable operations further include rewriting at least one of the two cascading style sheet definitions based on the rule, resulting in non-conflicting cascading style sheet definitions and providing the non-conflicting cascading style sheet definitions together with related content to the client.

A computer program product for conflict resolution of cascading style sheet definitions from multiple sources includes a computer readable storage medium having program code stored thereon. The program code is executable by a processor to perform a method. The method includes storing a rule for a rewriting of cascading style sheet definitions and intercepting, within a proxy component comprising a processor, a client server communication of a web page request, wherein the web page request originates from a client, and wherein a response to the web page request comprises at least two cascading style sheet definitions. The method further includes rewriting at least one of the two cascading style sheet definitions based on the rule, resulting in non-conflicting cascading style sheet definitions and providing the non-conflicting cascading style sheet definitions together with related content to the client.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
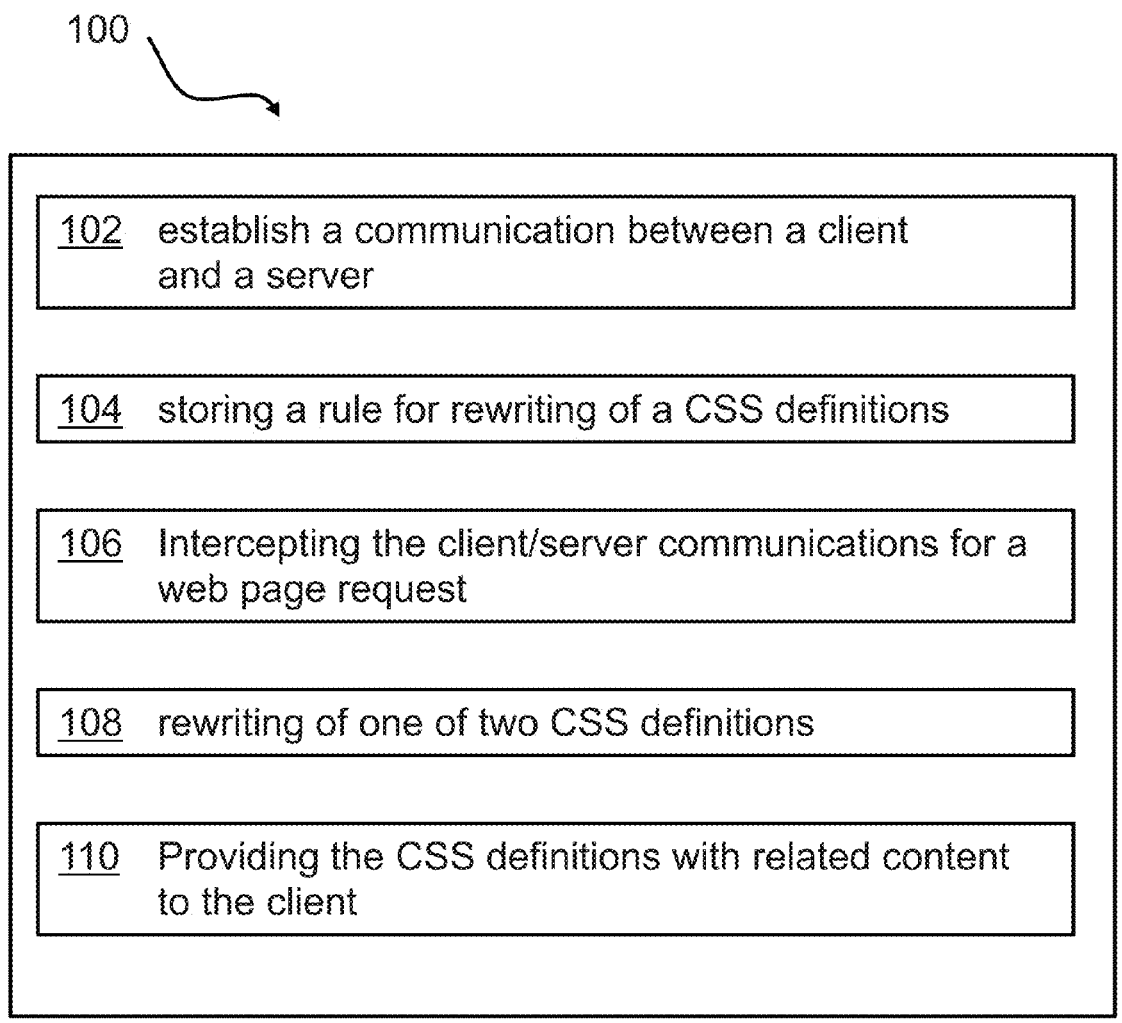
FIG. 1 shows a block diagram of an embodiment of the inventive method.

The embodiments of the invention relate generally to a method for automatic conflict resolution of cascading style sheet definitions. The embodiments of the invention relate further to a conflict resolution module, a web server module, a computing system, a data processing program, and a computer program product.

There exists a need for Cascading Style Sheets (CSS) definition handling allowing a higher degree of freedom when designing a portal page and related portlets and not being bound to a strict determination and mutual exclusive CSS definitions. This need may be addressed by a method for automatic conflict resolution of cascading style sheet definitions, a conflict resolution module, a web server module, a computing system, a data processing program, and a computer program product according to the independent claims.

According to one embodiment, a method for conflict resolution—in particular an automatic conflict resolution—of cascading style sheet definitions from multiple sources may be provided. A communication between a server and a client may be established via a proxy component. The method to be executed at the proxy component may comprise storing a rule, in particular a plurality of rules, for a rewriting of cascading style sheet definitions. In particular, the rules may comprise at least one rewrite specification for a rewrite of at least one of the cascading style sheet definition; the rewriting rule may be based on a source of the cascading style sheet definition file. The method may further comprise intercepting the client server communication of a web page request, wherein the web page request originates from the client, and wherein a response to the web page request may comprise two cascading style sheet definitions, and rewriting, based on the rule, of one of the two cascading style sheet definitions, resulting in non-conflicting cascading style sheet definitions. Finally, the method may comprise providing the non-conflicting cascading style sheet definitions together with related content to the client. There, the content may be displayed using the altered CSS definition to be applied.

According to another embodiment, a conflict resolution module may be provided. The conflict resolution module, or, in other words an element of a proxy or a proxy element, for automatic conflict resolution of cascading style sheet definitions from multiple sources, may comprise a rule storage unit adapted for storing a rule for a rewriting of cascading style sheet definitions. A related communication between a server and a client may be established via a proxy component. The conflict resolution module may also comprise an intercepting unit adapted for intercepting the client server communication of a web page request, wherein the web page request originates from the client, and wherein a response to the web page request comprises two cascading style sheet definitions. The conflict resolution module may further comprise a rewriting unit adapted for rewriting, based on the rule, of one of the two cascading style sheet definitions, resulting in non-conflicting cascading style sheet definitions, and a providing unit adapted for providing the non-conflicting cascading style sheet definitions together with related content to the client.

It may be noted that the client may be a web browser or any other requesting/receiving program or unit.

A skilled person will understand that the request may comprise—besides content—a request for a page markup and related requests for referenced CSS files. It may well be that no related CSS files may be available, as well as that at least two of the CCS definitions may be in conflict.

In the context of this application, the following conventions may be followed:

CSS—The term "CSS" or "cascading style sheet" may be understood as a conventional style sheet language used to describe the presentation semantics—the look and formatting—of a document written in a markup language. Its most common application is to style web pages written in HTML and XHTML, but the language may also be applied to any kind of XML document, including plain XML, SVG and XUL. CSS may be designed primarily to enable the separation of document content—written in HTML or a similar markup language—from document presentation, including elements such as the layout, colors, and fonts. This separation can improve content accessibility, provide more flexibility and control in the specification of presentation characteristics, enable multiple pages to share formatting, and reduce complexity and repetition in the structural content, such as by allowing for tableless web design. A CSS definition may denote a set of expressions of the style sheet language. The CSS definition may be storable in a file.

Conflict resolution—This term may denote the circumstance that after a conflict resolution no conflict exists any longer between related elements. The conflict may be seen in the fact that, e.g., two CSS definitions may exist at the same time, but only one may be used at a point in time. After the conflict resolution it may be decided to use either one of the two CSS definitions or for a parallel usage.

Proxy—In computer networks, a proxy server may denote a server (a computer system or an application) or server component that acts as an intermediary for requests from clients seeking resources from other servers. A client may connect to the proxy server, requesting some service, such as a file, connection, web page, or other resources available from a different server. The proxy server evaluates the request according to its filtering rules. For example, it may filter traffic by IP address (IP=Internet Protocol) or protocol. If the request may be validated by the filter, the proxy may provide the resource by connecting to the relevant server and requesting the service on behalf of the client to finally, deliver the result of the request to the client.

Rule—The term rule may denote instructions for a decision, in particular, a decision about which CSS definition to use. The rule may be based on a source of the requested content, a source of the CSS definition, or other content inside the CSS definitions.

Interception—The term "interception" may denote an active intervention in a client/server communication on a proxy or proxy server. The interception may change a request or a result of the request from a client.

Client server communication—This term may denote a relationship between two computer programs in which one program, the client, makes a service request from another program, the server, which fulfills the request. In some cases, the client may reside and being executed on one computer and the other computer program may be executed on another computer. However, this may not be a necessary condition.

Web page request—The term web page request may denote a request for a web page, or parts of a web page, which may typically reside on one or more servers.

Temporary model—This term may denote a transient temporary model or data model that may be stored in a storage unit, in particular in a transient temporary model store. This may contain a representation of all CSS definitions of a particular requested web page view. This representation may contain respective CSS selectors, the current value for each selector, and the CSS source—or source association—of this selector. An implementation example for the temporary model may be a tree structure, as described below.

CSS source association—This term may denote a link between a specific CSS and a specific source on a server.

Over-write—The term "over-write" may denote the process of a redefinition or rewrite of certain parameter values. A CSS definition may be over-written by another one, such that the over-written CSS definition may no longer be valid, but only the over-writing one.

Non-conflicting—This term may, in particular in the context of over-writing and CSS definitions, denote a situation in which CSS definitions for different portlets of a web portal page may not have contradictory content or contradictory application rules. One way of having non-conflicting CSS definitions may be that one definition is used instead of another CSS definition. Alternatively, several CSS definitions may be used, each for their respective portlet, such that different styles or markups may be used for different portlets within one web portal page, but eventually for different portlets.

Parallel usage—The term parallel usage may—in this context—denote the fact that two things, e.g., two CSS definitions, may exist and may be applied at the same time, i.e., on the same requested web page.

Portal—The term portal—also described as links page—may denote a layout of a web site that functions as a point of access to information in the World Wide Web or an intranet of an enterprise, or a mixture of both. A portal may present information from diverse sources in a unified way, in particular in portlets. Portlets may denote sub-windows of a portal window. Apart from the standard search engine feature, web portals may offer other services such as e-mail, news, stock prices, information, databases and entertainment. Portals may provide a way for enterprises to provide a consistent look and feel with access control and procedures for multiple applications and databases, which otherwise would have been different entities altogether.

The proposed method for automatic CSS conflict resolution may offer a couple of advantages.

The inventive methods may allow using more than one CSS definition in parallel meaning at the same time on the same page. It may no longer be required to decide for one CSS definition for a whole web page. The last applied CSS definition will not be used for the complete web page. For different portlets on a web page, or in a web portal, different CSS definitions and thus different headings and appearances of content or heading of portlet may be possible. This may give a programmer, or designer of web pages, much more freedom in the design process and it may deliver better comprehensibility for a reader or user of a requested web page. The usability of a portal may thus be increased.

In one embodiment of the method, the method may comprise that the proxy component may store a temporary model that may be adapted for representing cascading style sheet definitions. Such a model may be the central information point for applying a specific rule for rewriting CSS definitions.

According to a further embodiment of the method, the temporary model may be based on a tree structure. Such a structure may allow for an easy navigation of a decision module applying the rules. Tree structures are generally well suited for decision processes.

In another embodiment of the method, the tree structure may comprise elements consisting of a cascading style sheet selector, a value, and a cascading style sheet source association indicative of one of the multiple sources. Thus, an origin of a CSS and/or its content may be described by CSS source association. The CSS may be accessed using this CSS source association. This way, all relevant information components of a CSS definition may be available for a decision process when applying the rule or rules for rewriting of CSS definitions.

According to again a further embodiment of the method, the rule for the rewriting of one of the two cascading style sheet definitions may comprise a first specification for an over-write of the first cascading style sheet definition by the second cascading style sheet definition based on the source associations of the two cascading style sheet definitions. With this, the rules may be based on the content and values of the CSS definition. In this case, it may be based on the origin of a CSS definition and its related content.

In another embodiment of the method, the rule for a rewriting of the one of the two cascading style sheet definitions may comprise a second specification for a parallel usage of the first cascading style sheet definition and the second cascading style sheet definition based on the source associations of the two cascading style sheet definitions. Other decision criteria for a parallel usage may also be defined.

In a preferred embodiment of the method, the rules may take content elements of the two cascading style sheet definitions as input parameters. This may enable a decision based on content of the CSS definitions. In particular, the source association may be used as a specific content. However, any element may be used. Other examples may be a fit or harmonization of color schemes of the CSS definitions. This means that if two colors are pretty close to a color value, the difference in color values may be increased for a better comprehensibility of different portal elements.

In another preferred embodiment of the method, the multiple sources of the CSS definitions, or related content, may be grouped into categories, such that all members of a specific category may be treated equally when applying the rules. This way, rules may be applied to a larger group of sources enabling a common treatment, e.g., in a financial application, all stock prices may be presented in the same way, reducing performance requirement for the portal and enhancing a re-recognition of specific information elements in a portal.

There may also be a web server module provided that may comprise the conflict resolution module. The two elements—the web server module as well as the conflict resolution module, or the proxy element respectively, may be installed and maintained together reducing the maintenance effort for the two modules.

The web server module may be implemented stand-alone or in conjunction with a computing system. Such a typical configuration of a web server module together with a computing system may also enable an easier maintenance and integration into computing networks.

In another embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may comprise a semi-conductor or solid state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for an automatic conflict resolution of cascading style sheets will be described. Afterwards, embodiments of the method, a conflict resolution module and a computing system will be described.

FIG. 1 shows a block diagram 100 of an embodiment of the inventive method 100 for conflict resolution of cascading style sheet definitions from multiple sources, wherein a communication between a server and a client is established, 102, via a proxy component. The method 100, which may be executed at the proxy component, may comprise storing, 104, a rule for a rewriting of cascading style sheet definitions. In particular, the rule or rules may comprise at least one rewrite specification for a rewrite of at least one of the cascading style sheet definition. The method may also comprise intercepting, 106, the client server communication of a web page request, wherein the web page request originates from the client, and wherein a response to the web page request comprises at least two cascading style sheet definitions, and rewriting, 108, of one of the two cascading style sheet definitions based on the rule, resulting in non-conflicting cascading style sheet definitions. The method may also have provisions for providing, 110, the non-conflicting cascading style sheet definitions together with related content to the client.

Figure 2:
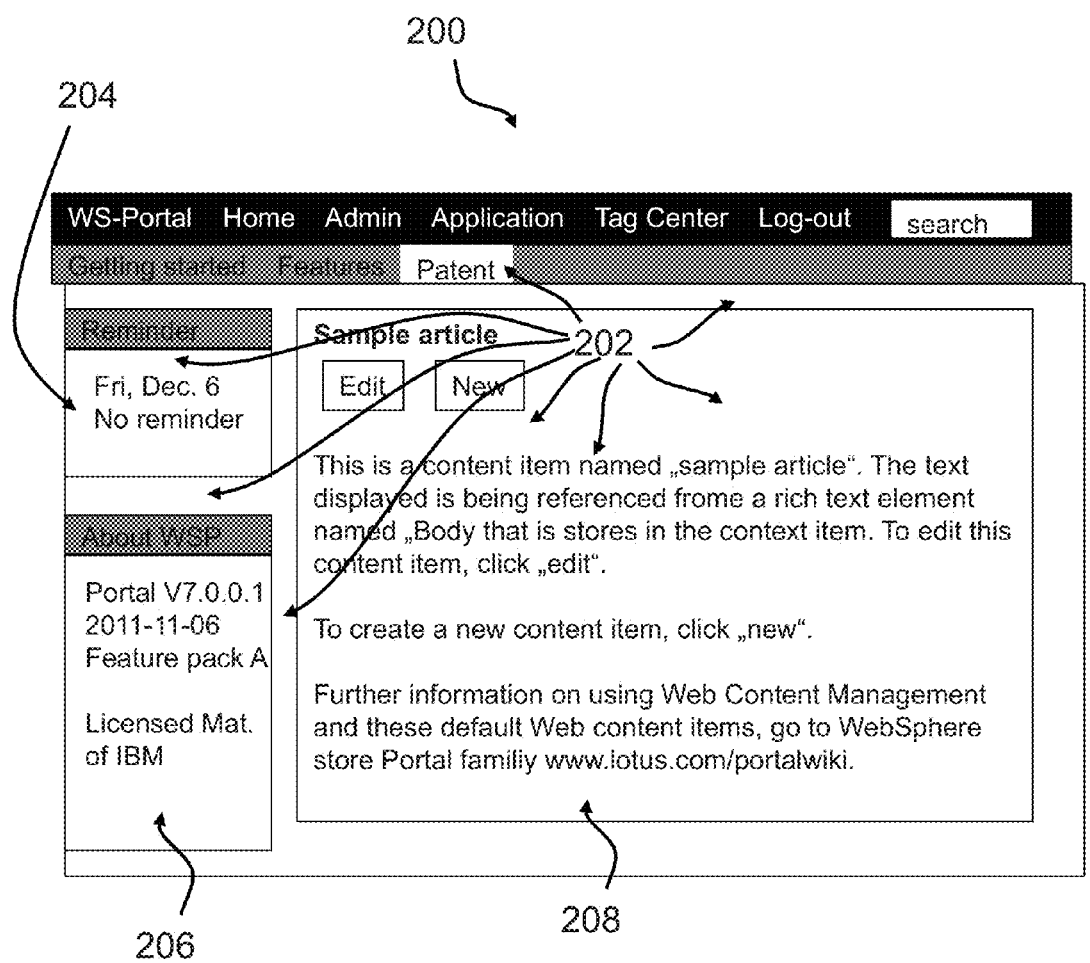
FIG. 2 shows a block diagram of an embodiment of a web page on a portal.

FIG. 2 shows a block diagram of an embodiment of a web page 200 on a portal. The web page, or portal page, 200 may be displayed on a computer screen. There may be a general layout with a headline comprising the terms "WS-Portal,", "Home", "Admin", "Tag Center", etc. The conventional mechanisms of CSS work well in environments where a web site operator has control over the styles that are being delivered as part of the portal. For solutions that aggregate markup from multiple sources, in particular portal environments, the following problems may occur:

A complex web site may usually consist of more than one style element. For example, there may be a definition for PortletA 204, another one for PortletB 206 and another one for the surrounding theme 202. It may be clear to an person skilled in the art that reference numeral may not only designate the flag "Patent" but also the complete, related sub-screen. This may be indicated by several reference numerals 202 pointing to different places of the sub-page also comprising the portlets 204 and 206.

The only two mechanisms that CSS can follow is the cascading and the time based one—meaning that there is no solution if two styles are defined for the same selector on an equal level besides the approach implemented by browsers that the one that is being loaded last will be applied.

In a first example scenario, two portlets PortletA and PortletB on the same portal page define CSS definitions for the same selector "customStyle", but with different values. PortletA may contain a markup element <span class="customStyle">Title Portlet A</span>, and PortletB a markup element <span class="customStyle">Title Portlet B</span>. The desired result would be that the title of each portlet may be styled by the CSS definition that is delivered by the portlet itself. The following describes the way how such a portal page may be interpreted with the state of the art approach in a browser and shows the result. In this description, the following assumptions have been made for simplification:

The style for PortletA is loaded before the one for PortletB. Exchanging this would affect the actual visual result but not changing the problem description.

No styles have been loaded so far and no other styles, besides the discussed ones, exist.

A potential timeline of activities may look like the following: The style for PortletA, e.g., from external file portletAstyle.css, is loaded and handed over to the browser engine. The portletAstyle.css contains a definition for the "customStyle" class with values specifying the font-size 10 px (pixels) and the color red. The browser decision engine checks if an inline style is present. If this is not the case, the style is applied to all elements that have the "customStyle" attribute. The result is that the definition from portletAstyle.css is applied to both portlets titles, i.e., both Title PortletA and Title PortletB are displayed with font size 10 px and red color.

Now the style from PortletB, e.g., from external file portletBstyle.css, is loaded and the same steps, as above, are processed. The portletBstyle.css contains a definition for the "customStyle" class with values specifying the font-size 15 px and the color green. The result is that—since this style is loaded later—it is applied to the page with the result that all font-sizes are now size 15 px and green as defined by the CSS definition of PortletB. Such a result may be different from the desired design result, in which a parallel usage of CSS definition should be used, i.e., for the title of PortletA a font size of 10 px in red color, and the title of PortletB a font size of 15 px in green color.

Figure 3:
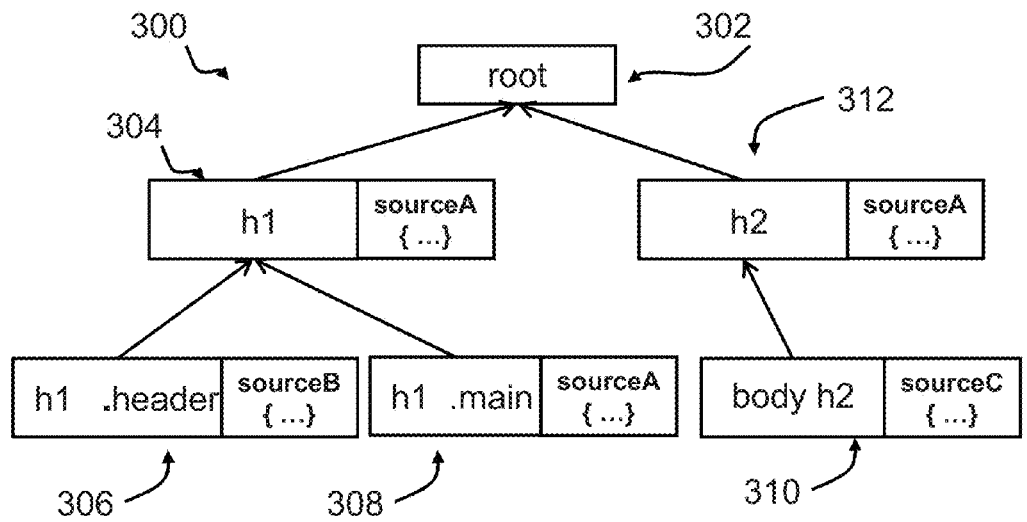
FIG. 3 shows a block diagram of an embodiment of a tree structure of the temporary model.

FIG. 3 shows a block diagram 300 of an embodiment of a tree structure of the temporary model, where each tree element 302, 304, 306, 308, 310, 312 may represent a particular CSS definition selector (e.g., h1) and property set (e.g., {color:blue;}). Each element may be tagged to the CSS source that has contributed the value for this exact definition, e.g., "sourceA" in block 312 may denote that the current property set stems from content source A. CSS specificity relationships may be represented as parent-child relations in the tree 300. The arrows between the blocks 302, 304, 306, 308, 310, 312 may denote "specializes", i.e., 306 and 308 specialize 304. The blocks may represent the CSS definitions at a particular point in time and the conflict resolution according to the rules as defined in this embodiment may be implemented as appropriate tree modification operations.

In the example of FIG. 3, "sourceA" in block 312 maybe be tagged to content source A, and the brackets "{ . . . }" may contain the CSS values after merging. The blocks on the left side—blocks 304, 306, 308—may represent CSS definitions before the merger and before an application of a rewriting rule.

Figure 4:
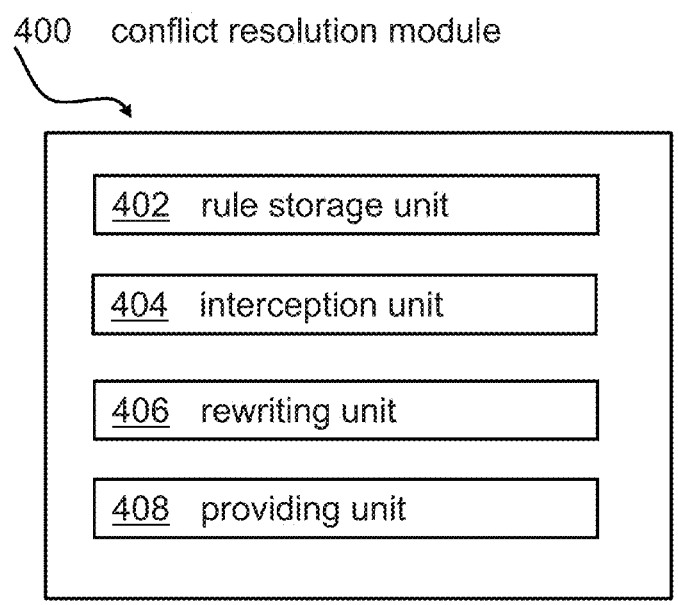
FIG. 4 shows a block diagram of an embodiment of the conflict resolution module.

FIG. 4 shows a block diagram of an embodiment of the conflict resolution module 400, which may be a component of a proxy element, for automatic conflict resolution of cascading style sheet definitions from multiple sources. A communication between a server and a client may be established via the proxy component. The conflict resolution module 400 may comprise a rule storage unit 402 adapted for storing a rule for a rewriting of cascading style sheet definitions, and an intercepting unit 404 adapted for intercepting the client/server communication of a web page request, wherein the web page request originates from the client (502), and wherein a response to the web page request comprises two cascading style sheet definitions.

The conflict resolution module 400 may also comprise a rewriting unit 406 adapted for rewriting of one of the two cascading style sheet definitions, resulting in non-conflicting cascading style sheet definitions, and a providing unit 408 adapted for providing the non-conflicting cascading style sheet definitions together with related content to the client.

Figure 5:
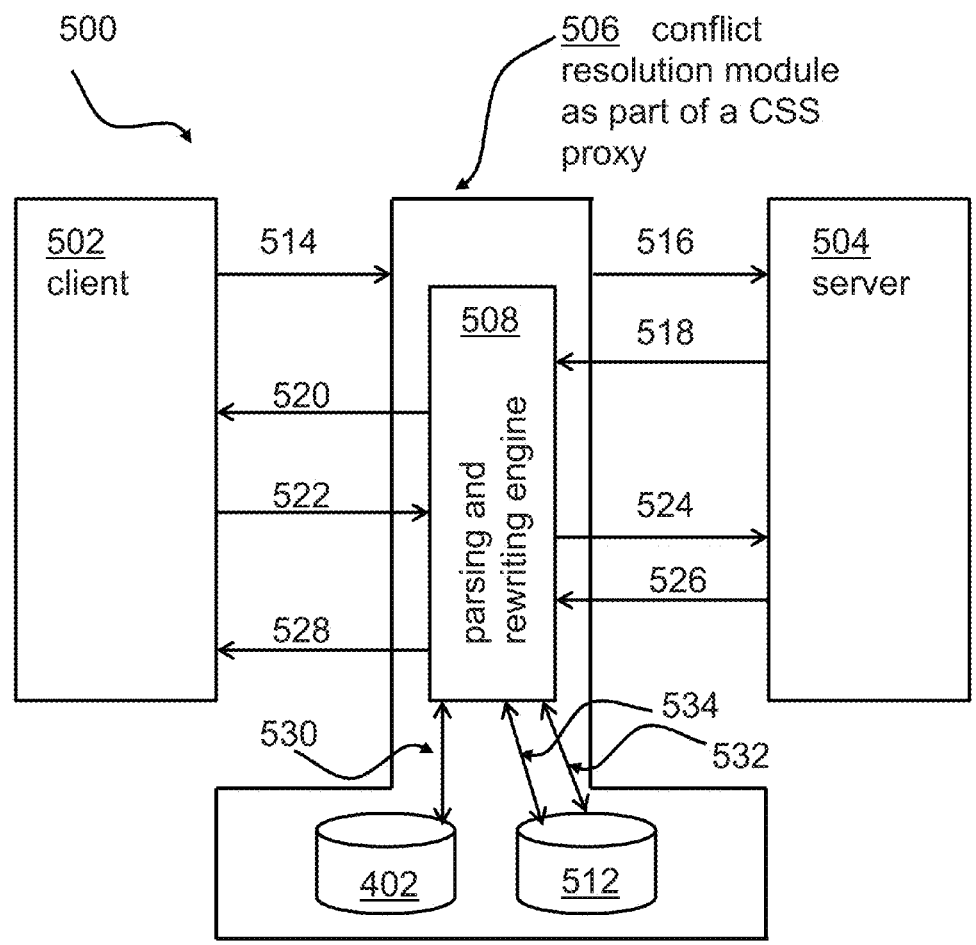
FIG. 5 shows a block diagram of an embodiment of a conflict resolution module in a client/server communication environment.

FIG. 5 shows a block diagram of an embodiment of a conflict resolution module in a client/server communication environment. The disclosed conflict resolution module 506 may intercept the communication between the client 502, typically a browser program, and the server 504 that may deliver web pages with content from multiple sources, typically a portal server. The main subcomponents of the conflict resolution module 506 are:

- a parsing and rewriting engine 508 that may be able to read and replace any text data contained in the client/server communication,
- a persistent rule store or rule storage unit 402 that may store configuration and policy information related to how CSS conflicts are resolved, in this description, based on CSS sources, and
- a transient temporary model store 512, where the CSS styles for particular web pages are temporarily stored.

The parsing and rewriting engine 508 may be the coordinating component of the conflict resolution module, in particular, a CSS proxy that intercepts the server response, parses it, and rewrites it in correspondence with the rules stored in the rule store, using the temporary model store. The exact functionality of this component is described in detail using a sequence flow.

A typical interaction sequence in a scenario using the disclosed conflict resolution module is described as follows:

514: The browser, or client, 502 requests a web page from the server 504. The request is intercepted by the conflict resolution module 506.

516: The conflict resolution module 506 forwards the web page request to the server.

518: The server 504 sends the response containing the web page markup to the CSS proxy or conflict resolution module 506, which routes it to the internal parsing and rewriting engine 508.

520: The parsing and rewriting engine creates an id for the current web page request and associates, 532, an initially empty temporary model 512 of the CSS definitions to it. It then parses the markup and rewrites it in the following way:

a) For any global embedded CSS definitions, it stores those definitions to the temporary model 512 of the current web page request associated with the source information "embedded".

b) For any CSS style references in the markup (i.e., an expression like <link rel="stylesheet" type="text/css" href="/css/c1.css"/>), it rewrites the link adding a parameter for the current web page request (e.g., <link rel="stylesheet" type="text/css" href="/css/c1.css?requestId=1234"/>)

c) For any markup element that matches the defined pattern of a CSS source according to the rule store, it rewrites the markup by adding a unique, additional CSS class annotation representing the source (e.g., <div id="portletContainer123" class="portletContainer123").

d) For any embedded CSS definition inside a markup element according to c), it merges the CSS definitions to the temporary model and rewrites the CSS definitions if necessary. This is executed for each CSS definition selector in the following way:

If there is not yet a CSS definition with the same selector in the temporary model, the CSS definition and value to the temporary model associated with the determined CSS source may be added. The CSS definition in the response remains unchanged and is not rewritten.

If there is already a CSS definition with the same selector in the temporary model, it retrieves the associated CSS source of the existing definition from the temporary model. It then retrieves the stored rule for the existing source and the new source from the rule store, 530. Depending on the rule, the parsing and rewriting engine 508 executes the following:

1. The existing source over-writes the new source: The temporary model 512 remains unchanged. The CSS definition in the response is omitted, i.e., rewritten with an empty string.

2. The new source over-writes the existing source: The respective CSS selector in the temporary model 512 is updated with the new values and associated with the new source. The CSS definition in the response remains unchanged and is not rewritten.

3. Both, the new source and the existing source keep their individual CSS definitions: The temporary model is updated with two new more specific child elements for the respective CSS selector by adding the unique, additional CSS classes for the CSS sources, as defined in step c). Each of the more specific CSS selectors is associated to the corresponding CSS source and gets the value of it. The parent CSS selector is reset to not containing any value and not being associated to any CSS source. The CSS definition in the response is also rewritten to the two more specific selectors and values from the two sources.

520: The CSS proxy returns the rewritten markup to the browser.

522: The browser 502 automatically requests a CSS file referenced in the markup. The link to this CSS file has been rewritten in the step before (see above), and therefore contains a parameter for the current web page request (e.g., /css/c1.css?requestId=1234). The request is again intercepted by the CSS proxy 506.

524: The CSS proxy 506 requests the original CSS file (/css/c1.css) from the server 504.

526: The server 504 returns the CSS file containing a set of CSS definitions to the proxy, which routes it to the internal parsing and rewriting engine.

536: The parsing and rewriting engine 508 determines the CSS source for this CSS file, e.g., based on URL patterns stored in the rule store unit 402, and loads the rules for this CSS source.

534: The parsing and rewriting engine 508 loads the temporary model for this web page request based on the request parameter. It merges the CSS definitions from the CSS file with the temporary model and rewrites the CSS definitions in the file if necessary. The rewriting and updates to the temporary model stored in 512 are executed for each CSS definition selector in the way, as described in step d) above.

528. The CSS proxy returns the rewritten CSS file to the browser.

Steps 522 to 528 are repeated for any further CSS files referenced in the original web page.

The persistent rule store or rule storage unit 402 may be used to configure which sources for CSS definitions exist, how they are identified, and which preference rules must be used to resolve conflicts between CSS definitions from different sources.

A typical definition of a CSS source may comprise:
1. A pattern or regular expression that matches markup elements that may be associated to this CSS source (e.g., an expression like <div id="portletInstance*">, the * being a wildcard character, enclosing the markup of a portlet instance in a portal environment).
2. A pattern or regular expression that may match URLs pointing to CSS files of this CSS source (e.g., an expression like /portletapp/*.css, the * being a wildcard character, for CSS files contributed by portlets in a portal environment).

The rules may be defined in a way that for each combination of sources sourceA and sourceB it may be configured, which CSS definitions prevail in case of a conflict. Possible configurations may be:
1. sourceA over-writes sourceB,
2. sourceB over-writes sourceA, or
3. Both, sourceA and sourceB keep their individual CSS definitions.

In other words, the temporary model store 512 or transient temporary model store may contain a representation of all CSS definitions of a particular web page view. This representation may contain the respective CSS selectors, the current value for each selector, and the CSS source of this selector, as described above. An implementation example for the temporary model may be a tree structure, where each tree element represents a particular CSS definition selector (as indicated in the context of FIG. 3), e.g., h1, and property set, e.g., {color:blue;}, and is tagged with the CSS source that contributed the value for this exact definition. CSS specificity relationships are represented as parent-child relations in the tree (see above).

In an exemplary embodiment of the invention to the previously mentioned example scenario, a rule may be defined that both PortletA and PortletB should keep their own CSS definitions if there is a conflict. The resulting flow of actions may be as follows: The style from PortletA is being loaded through the CSS proxy. The CSS proxy processes this file according to the description for FIG. 5. Since the style from PortletA is the first style loaded, there is not yet any rewriting of the style definition necessary. However, the page markup is rewritten adding additional unique CSS classes for the container elements surrounding PortletA and PortletB (e.g., <div class="portletA"> for the div element surrounding the portlet markup). At this point of time, only the PortletA style is applied as previously, i.e., both titles are displayed with size 10 px and red color. Next, the browser loads the styles for PortletB again through the CSS proxy. The CSS proxy detects that there is already an equivalent definition from PortletA. According to the rule that both PortletA and PortletB should keep their individual style definitions, it rewrites the CSS to contain two more specific definitions for PortletA and PortletB, e.g., .portletA .customStyle {font-size: 10 px; color: red;} and .portletB .customStyle {font-size: 15 px;color: green;}.

These rewritten CSS definitions in combination with the rewritten markup leads to the desired result that the title of PortletA is displayed with size 10 px and color red, and the title of PortletB is displayed with size 15 px and color green.

Figure 6:
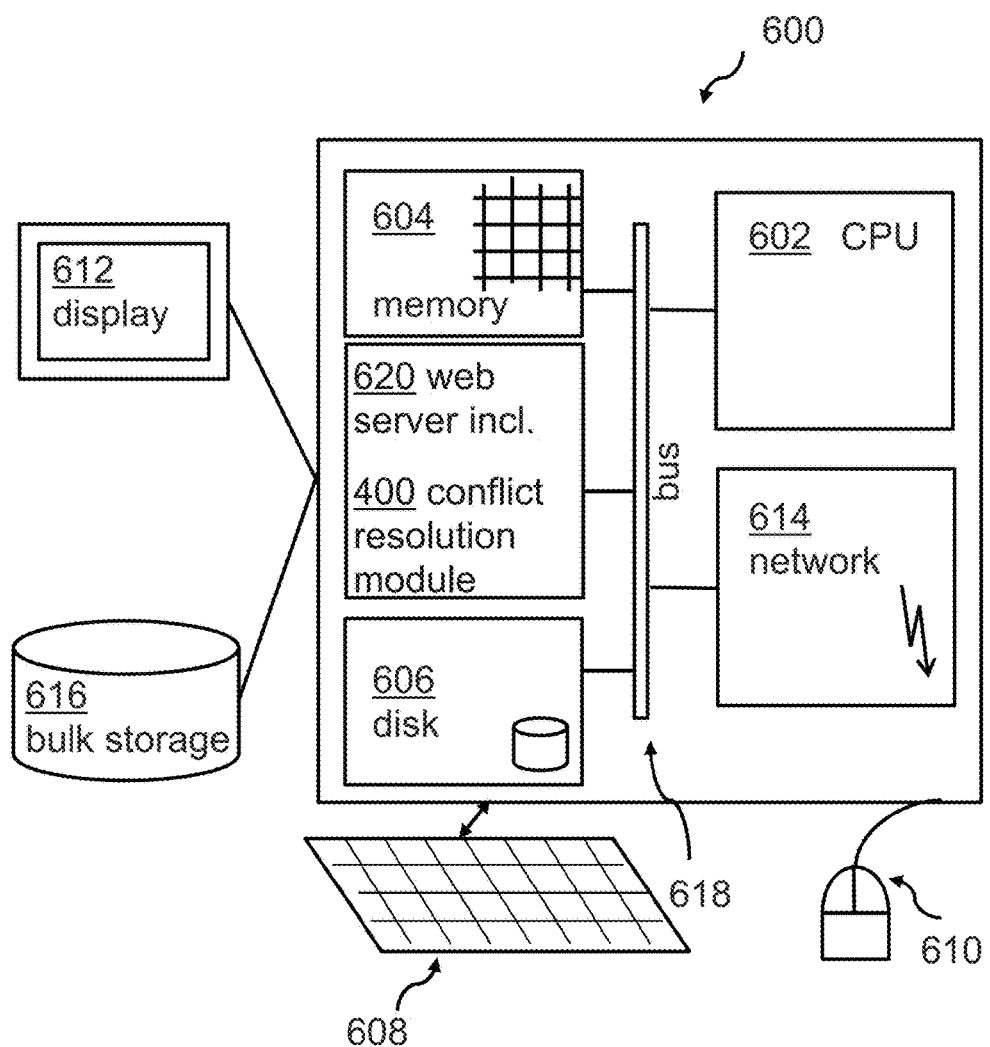
FIG. 6 shows an embodiment of a computing system including the conflict resolution module.

Embodiments of the invention may be implemented together with virtually any type of computer, regardless of the platform being suitable for storing and/or executing program code. For example, as shown in FIG. 6, a computing system 600 may comprise one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities, typical of today's computers (not shown). The memory elements 604 may comprise a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters. Additionally, the web server module 620 including a conflict resolution module 400 may be attached to the bus system 618. Alternatively, the conflict resolution module 400 may be attached directly to the bus system 618.

The computing system 600 may also comprise input means, such as a keyboard 608, a pointing device such as a mouse 610, or a microphone (not shown). Alternatively, the computing system may be equipped with a touch sensitive screen as main input device. Furthermore, the computer 600, may comprise output means, such as a monitor or screen 612 [e.g., a liquid crystal display (LCD), a plasma display, a light emitting diode display (LED, OLED), or cathode ray tube (CRT) monitor]. The computer system 600 may be connected to a network (e.g., a local area network (LAN), a wide area network (WAN), such as the Internet or any other similar type of network, including wireless networks via a network interface connection 614. This may allow a coupling to other computer systems or a storage network or a tape drive. Those, skilled in the art will appreciate that many different types of computer systems exist, and the aforementioned input and output means may take other forms. Generally speaking, the computer system 600 may comprise at least the minimal processing, input and/or output means, necessary to practice embodiments of the invention.

Further, those skilled in the art will appreciate that one or more elements of the aforementioned computer system 600 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

What is claimed is:

1. A method of conflict resolution of cascading style sheet definitions from multiple sources, the method comprising:
    storing a rule for a rewriting of cascading style sheet definitions;
    intercepting, within a proxy component comprising a processor, a client server communication of a web page request, wherein the web page request originates from a client, and wherein a response to the web page request comprises at least two cascading style sheet definitions;
    rewriting at least one of the two cascading style sheet definitions based on the rule, resulting in non-conflicting cascading style sheet definitions; and
    providing the non-conflicting cascading style sheet definitions together with related content to the client, wherein
    the rule for a rewriting of at least one of the two cascading style sheet definitions comprises a first specification for an over-write of the first cascading style sheet definition by the second cascading style sheet definition based on source associations of the two cascading style sheet definitions indicating ones of the multiple sources.

2. The method of claim 1, wherein the proxy component stores a temporary model adapted for representing cascading style sheet definitions.

3. The method of claim 2, wherein the temporary model is based on a tree structure.

4. The method of claim 3, wherein the tree structure comprises elements consisting of a cascading style sheet selector, a value, and a cascading style sheet source association indicative of one of the multiple sources.

5. The method of claim 1, wherein the rule takes content elements of the two cascading style sheet definitions as input parameters.

6. The method of claim 1, wherein the multiple sources are grouped into categories, such that all members of a specific category are treated equally when applying the rules.

7. A system for conflict resolution of cascading style sheet definitions from multiple sources, the system comprising:
    a processor programmed to initiate executable operations comprising:
        storing a rule for a rewriting of cascading style sheet definitions;
        intercepting a client server communication of a web page request, wherein the web page request originates from a client, and wherein a response to the web page request comprises at least two cascading style sheet definitions;
        rewriting at least one of the two cascading style sheet definitions based on the rule, resulting in non-conflicting cascading style sheet definitions; and
        providing the non-conflicting cascading style sheet definitions together with related content to the client, wherein
    the rule for a rewriting of at least one of the two cascading style sheet definitions comprises a first specification for an over-write of the first cascading style sheet definition by the second cascading style sheet definition based on source associations of the two cascading style sheet definitions indicating ones of the multiple sources.

8. The system of claim 7, comprising a memory storing a temporary model adapted for representing cascading style sheet definitions.

9. The system of claim 8, wherein the temporary model is based on a tree structure.

10. The system of claim 9, wherein the tree structure comprises elements consisting of a cascading style sheet selector, a value, and a cascading style sheet source association indicative of one of the multiple sources.

11. The system of claim 7, wherein the rule takes content elements of the two cascading style sheet definitions as input parameters.

12. The system of claim 7, wherein the multiple sources are grouped into categories, such that all members of a specific category are treated equally when applying the rules.

13. A computer program product for conflict resolution of cascading style sheet definitions from multiple sources, comprising:
    a computer readable storage device having program code stored thereon, the program code executable by a processor to perform:
        storing, using the processor, a rule for a rewriting of cascading style sheet definitions;
        intercepting, using the processor, a client server communication of a web page request, wherein the web page request originates from a client, and wherein a response to the web page request comprises at least two cascading style sheet definitions;
        rewriting, using the processor, at least one of the two cascading style sheet definitions based on the rule, resulting in non-conflicting cascading style sheet definitions; and
        providing, using the processor, the non-conflicting cascading style sheet definitions together with related content to the client, wherein
    the computer readable storage device does not consist of a transitory, propagating signal, and
    the rule for a rewriting of at least one of the two cascading style sheet definitions comprises a first specification for an over-write of the first cascading style sheet definition by the second cascading style sheet definition based on source associations of the two cascading style sheet definitions indicating ones of the multiple sources.

14. The computer program product of claim 13, wherein the program code further causes the processor to perform:
    storing a temporary model adapted for representing cascading style sheet definitions.

15. The computer program product of claim 14, wherein the temporary model is based on a tree structure.

16. The computer program product of claim 15, wherein the tree structure comprises elements consisting of a cascading style sheet selector, a value, and a cascading style sheet source association indicative of one of the multiple sources.

17. The computer program product of claim 13, wherein the rule takes content elements of the two cascading style sheet definitions as input parameters.

18. The computer program product of claim 13, wherein the multiple sources are grouped into categories, such that all members of a specific category are treated equally when applying the rules.

* * * * *